United States Patent
Agarwal et al.

(10) Patent No.: US 9,998,947 B2
(45) Date of Patent: Jun. 12, 2018

(54) INTELLIGENT HANDLING OF VOICE CALLS FROM MOBILE VOICE CLIENT DEVICES

(71) Applicant: Aruba Networks, Inc., Sunnyvale, CA (US)

(72) Inventors: Gopal Agarwal, Bangalore Karnataka (IN); Ramesh Ardeli, Sunnyvale, CA (US); Venkatesh Joshi, Bangalore Karnataka (IN); Vamsi Kodavanty, Sunnyvale, CA (US); Hari Kurmala, Sunnyvale, CA (US); Edward Vajravelu, Bangalore Karnataka (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days. days.

(21) Appl. No.: 15/267,294

(22) Filed: Sep. 16, 2016

(65) Prior Publication Data

US 2017/0006495 A1    Jan. 5, 2017

Related U.S. Application Data

(63) Continuation of application No. 14/332,144, filed on Jul. 15, 2014, now Pat. No. 9,510,233.

(51) Int. Cl.
| | | |
|---|---|---|
| *H04W 72/00* | (2009.01) | |
| *H04W 28/02* | (2009.01) | |
| *H04W 76/06* | (2009.01) | |
| *H04L 12/801* | (2013.01) | |
| *H04W 28/08* | (2009.01) | |

(52) U.S. Cl.
CPC ......... *H04W 28/0289* (2013.01); *H04L 47/11* (2013.01); *H04W 28/0236* (2013.01); *H04W 28/08* (2013.01); *H04W 76/064* (2013.01)

(58) Field of Classification Search
CPC ..... H04L 47/11; H04L 67/1038; H04L 47/32; H04L 67/1027; H04W 28/08; H04W 36/22; H04W 36/0061; H04W 36/0072; H04W 36/0077; H04W 36/04; H04W 36/30; H04W 84/18; H04W 40/02; H04W 48/06; H04W 72/00
USPC ...... 455/453, 456.2, 416, 418, 426.1, 426.2, 455/435.1, 437, 438, 439, 444, 450
See application file for complete search history.

(56) References Cited

U.S. PATENT DOCUMENTS

| | | | |
|---|---|---|---|
| 5,873,031 A | 2/1999 | Griffith et al. | |
| 2004/0125777 A1* | 7/2004 | Doyle | H04W 48/18 370/338 |

(Continued)

*Primary Examiner* — Fred Casca
(74) *Attorney, Agent, or Firm* — Hewlett Packard Enterprise Patent Department

(57) ABSTRACT

The present disclosure discloses a method and network device for intelligent handling of voice calls from mobile voice client devices. In some embodiments, the network device detects that a load, corresponding to a plurality of client devices associated with an access point, exceeds a particular threshold value. In some embodiments, the network device detects that a call quality for a current ongoing call, corresponding to a first client device associated with an access point, is below a first threshold value. In response, the network device selects a particular client device, of the plurality of client devices associated with the access point, for disassociation with the access point. The network device then causes the particular client device to disassociate with the access point.

20 Claims, 17 Drawing Sheets

(56) References Cited

U.S. PATENT DOCUMENTS

| | | |
|---|---|---|
| 2004/0213390 A1 | 10/2004 | Lazarus et al. |
| 2005/0047579 A1* | 3/2005 | Salame ............ H04L 29/06027 |
| | | 379/265.09 |
| 2006/0002350 A1* | 1/2006 | Behroozi .............. H04W 36/30 |
| | | 370/338 |
| 2008/0165748 A1 | 7/2008 | Visotsky et al. |
| 2008/0171568 A1* | 7/2008 | Choi ................. H04W 52/0245 |
| | | 455/522 |
| 2011/0075556 A1* | 3/2011 | Li ........................ H04W 28/08 |
| | | 370/230 |
| 2012/0020339 A1* | 1/2012 | Lai ....................... H04W 48/20 |
| | | 370/338 |
| 2013/0163566 A1* | 6/2013 | Youn .................... H04W 36/30 |
| | | 370/332 |
| 2013/0176853 A1* | 7/2013 | Mahr ................ H04W 36/0083 |
| | | 370/236 |
| 2013/0182584 A1* | 7/2013 | Maguluri ........... H04W 76/023 |
| | | 370/252 |
| 2014/0317265 A1 | 10/2014 | James et al. |
| 2015/0110003 A1 | 4/2015 | Wilkinson |
| 2015/0172957 A1 | 6/2015 | Sarawat et al. |
| 2015/0215851 A1 | 7/2015 | Sivavakeesar |
| 2015/0271829 A1* | 9/2015 | Amini ................... H04W 24/02 |
| | | 370/329 |
| 2016/0183147 A1* | 6/2016 | Da Silva ........... H04W 36/0055 |
| | | 370/331 |

* cited by examiner

| APPLCATION 710 | APPLCATION CATEGORY 720 | ACCESS CATEGORY 730 | PRIORITY 740 |
|---|---|---|---|
| GMAIL | WEBMAIL | BACKGROUND | LOWEST |
| BIT TORRENT | PEER-TO-PEER | BACKGROUND | |
| EDONKEY | PEER-TO-PEER | BACKGROUND | |
| YAHOO MESSENGER | INSTANT MESSAGNG | BEST EFFORT | |
| WHATSAPP | INSTANT MESSAGNG | BEST EFFORT | |
| WECHAT | INSTANT MESSAGNG | BEST EFFORT | |
| TWITTER | WEB | BEST EFFORT | |
| FACEBOOK | WEB | BEST EFFORT | |
| YOUTUBE | WEB | NON-ENTERPRISE VIDEO | |
| NETFLIX | AUDIO-VIDEO | NON-ENTERPRISE VIDEO | |
| SKYPE | INSTANT MESSAGNG | NON-ENTERPRISE VIDEO | |
| GOTOMEETING | AUDIO-VIDEO | ENTERPRISE VIDEO | |
| WEBEX | AUDIO-VIDEO | ENTERPRISE VIDEO | |
| ADOBE-CONNECT | AUDIO-VIDEO | ENTERPRISE VIDEO | |
| LYNC VIDEO | AUDIO-VIDEO | ENTERPRISE VIDEO | |
| GTALK | INSTANT MESSAGNG | VOICE | |
| JABBER | INSTANT MESSAGNG | VOICE | |
| LYNC AUDIO | AUDIO-VIDEO | VOICE | HIGHEST |

FIG. 7

| CLIENT MAC 810 | NUMBER OF SESSIONS 820 | | | | |
|---|---|---|---|---|---|
| | VOICE 830 | E VIDEO 840 | NE VIDEO 850 | BEST EFFORT 860 | BACKGROUND 870 |
| AA:BB:CC:DD:EE:01 | 0 | 0 | 2 | 5 | 10 |
| AA:BB:CC:DD:EE:02 | 0 | 0 | 0 | 5 | 5 |
| AA:BB:CC:DD:EE:03 | 1 | 0 | 0 | 5 | 10 |
| AA:BB:CC:DD:EE:04 | 0 | 0 | 1 | 0 | 20 |
| AA:BB:CC:DD:EE:05 | 0 | 1 | 0 | 2 | 10 |

FIG. 8

| ACCESS POINT 910 | NUMBER OF SESSIONS 920 | | | | | LOAD FACTOR 990 |
|---|---|---|---|---|---|---|
| | VOICE 935 | E VIDEO 945 | NE VIDEO 955 | BEST EFFORT 965 | BKGD 975 | |
| AP₁ | 0 | 0 | 1 | 5 | 10 | 30 |
| AP₂ | 0 | 5 | 0 | 5 | 5 | 115 |
| AP₃ | 1 | 0 | 3 | 5 | 10 | 54 |
| AP₄ | 2 | 0 | 0 | 10 | 5 | 33 |
| ... | ... | ... | ... | ... | ... | ... |
| APₙ | 2 | 1 | 5 | 2 | 10 | 92 |

FIG. 9

INTELLIGENT HANDLING OF VOICE CALLS FROM MOBILE VOICE CLIENT DEVICES

CLAIM FOR PRIORITY

This application is a Continuation of commonly assigned and corresponding U.S. patent application Ser. No. 14/332,144, filed Jul. 15, 2014, and entitled "INTELLIGENT HANDLING OF VOICE CALLS FROM MOBILE VOICE CLIENT DEVICES", which is incorporated by reference in its entirety.

Embodiments of the present disclosure relate to call management in local area networks. In particular, embodiments of the present disclosure describe a method and network device for intelligent handling of voice calls from mobile voice client devices.

BACKGROUND

A typical Wireless Local Area Network (WLAN) deployment consists of a collection of Access Points (APs) spread over a geographical area. The placement of each Access Point within the geographical area is determined via a radio frequency (RF) Planning tool. The RF planning tool is a wireless deployment modeling tool that helps the administrator design an efficient network that optimizes coverage and capacity.

Coverage relates to the geographical footprint within the system that has sufficient Radio Frequency (RF) signal strength to provide for a call/data session. Capacity relates to the capability of the system to sustain a given number of subscribers. Capacity and coverage are two important factors in the WLAN deployment. The network administrator needs to carefully plan the deployment keeping in mind the typical number of users, the network load and the expected levels of performance. In a typical network, the network administrator deploys the APs based on a set of use-cases that provide him or her estimates for (a the average number of users that would need to be serviced by the access points; and (b) the average traffic throughput that would need to be serviced by the access points.

Moreover, when the WLAN technology first came into existence, the WLAN was thought of as an overlay network that could be used as an extension of the wired network without promising any kind of reliability, security and performance guarantees. With the maturity of WLAN technology over time, currently, the WLAN is capable of providing similar levels of reliability, security and performance guarantees as those of a wired network.

In addition, with more and more enterprises adopting the "Bring Your Own Device (BYOD)" policy, the typical user has multiple wireless devices connected to the network. For example, a user might have a laptop, a smartphone, a tablet, an e-book reader, etc., all of which are connected to the network. Further, the devices are all capable of transmitting and receiving various categories of traffic, including but are not limited to, voice, video, bit-torrent, general data traffic, etc. With this kind of surge in device numbers and traffic amount, many network deployments would be placed under severe stress.

Call Admission Control (CAC) generally refers to a mechanism that protects voice traffic from the negative effects of other voice traffic and to keep excess voice traffic off the network. For example, a network administrator may limit the maximum number of voice users in a particular network. As another example, the network administrator may a given AP may not admit additional voice calls if the AP is currently handling more than a threshold amount of voice traffic. Nevertheless, the CAC mechanisms do not solve the problem if a non-voice client starts a large amount of upload/download after a call has been admitted. There is no current mechanism for limiting the total number of clients once the maximum number of voice clients has been reached. Also, note that, CAC mechanism is typically used in a wired network where it is easy to predict and allocate bandwidth for wired clients. With interferences in a wireless network, an AP's allocation of bandwidth is typically only good for the instant the allocation was made because the network condition (e.g., interference levels) may change over time.

Also, some client devices have a preference for being associated with the same AP after it enters a voice call. For a client device with such a preference, if a voice call is initiated when the client device is located in a good coverage area, but the client device subsequently moves to a poor coverage area, the client device will not associate with a new AP. As a result, the client device will suffer from poor call quality after it moves to the new physical location.

In addition, conventional ClientMatch™ mechanism performs client steering when the signal strength, e.g., Signal-to-Noise Ratio (SNR), is below a threshold value. Thus, if the client continues to have good SNR, the client will keep being associated with the same AP, even though the AP may have been loaded with other clients doing heavy data transfer and other adjacent APs are lightly loaded.

Moreover, ClientMatch™ mechanism steers the clients to adjacent APs irrespective of the nature of sessions currently in transit for that client. Therefore, if the sessions in transit include latency sensitive traffic, for example, voice and/or video traffic, these sessions may experience undesirable latency or jitter if the client is steered to some other AP. Hence, steering clients based on SNR value alone may not be applicable for all use case scenarios.

BRIEF DESCRIPTION OF THE DRAWINGS

The present disclosure may be best understood by referring to the following description and accompanying drawings that are used to illustrate embodiments of the present disclosure.

FIG. 7 shows exemplary application information and categories according to embodiments of the present disclosure.

FIG. 8 shows exemplary session information and categories according to embodiments of the present disclosure.

FIG. 9 shows exemplary application-aware sessions currently running among APs according to embodiments of the present disclosure.

DETAILED DESCRIPTION

In the following description, several specific details are presented to provide a thorough understanding. While the context of the disclosure is directed to call management in local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to call management in local area networks. In particular, embodiments of the present disclosure describe a method and network device for intelligent handling of voice calls from mobile voice client devices. With the solution provided herein, the network device detects that a load, corresponding to a plurality of client devices associated with an access point, exceeds a particular threshold value. In some embodiments, the network device detects that a call quality for a current ongoing call, corresponding to a first client device associated with an access point, is below a first threshold value. In response, the network device selects a particular client device, of the plurality of client devices associated with the access point, for disassociation with the access point. The network device then causes the particular client device to disassociate with the access point.

Network Environment

Figure 1:
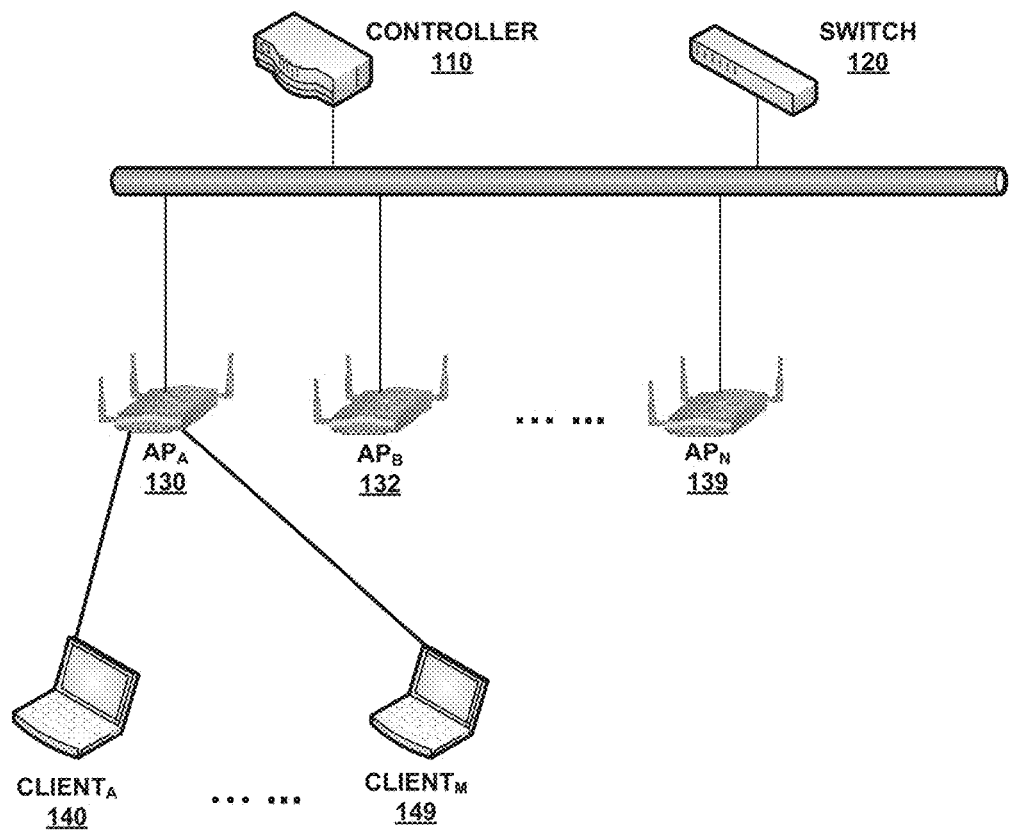
FIG. 1 shows an exemplary network environment according to embodiments of the present disclosure.

FIG. 1 shows an exemplary network environment according to embodiments of the present disclosure. Specifically, FIG. 1 illustrates a network that includes at least a switch 120, a network controller 110, and a plurality of network devices, such as $AP_A$ 130, $AP_B$ 132, . . . , $AP_N$ 139. Furthermore, multiple client devices are associated with each access point. For example, $Client_A$ 140 to $Client_M$ 149 are associated with $AP_A$ 130.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Switch 120 generally refers to a computer networking device that is used to connect devices together on a computer network by performing a form of packet switching. A switch can send a message only to the port connected to the device that needs or requests the message. A switch is a multi-port network bridge that processes and forwards data at the data link layer (layer-2) of the OSI (Open Systems Interconnection) model. A switch may also have additional features, including the ability to route packets, e.g., as layer-3 or multilayer switches.

Access points, such as $AP_A$ 110, $AP_B$ 112, . . . $AP_N$ 119, generally refer to a wireless network device that allows wireless client devices to connect to a wired network using IEEE 802.11 or related standards. The APs usually connect to a router via a wired network, but can also be an integral component of the router itself.

Each access point serves one or more client devices. Also, each client device and/or access point may connect to another network device and/or client device via a secure communication channel, such as an IPSec tunnel, which passes through a centralized network controller. For example, in FIG. 1, $Client_A$ 140 to $Client_M$ 149 are connected to $AP_A$ 130.

During operations, a mobile client device, such as $Client_M$ 149, may change its physical location, and thereby disassociate from one access point to another access point. The mobile client device may be executing various mobile applications, for example, an email client application, an instant messaging application, a web social network application, an online meeting application, a video conferencing application, etc. Different kinds of client applications will require different minimum levels of quality of service. For example, a mobile client device on an active voice call may be quite susceptible to delays, jitters, or packet losses in the network. By contrast, a mobile client device browsing a social network website will have a high tolerance for such delays, jitters, packet losses, etc. Therefore, it is crucial to ensure that, even in a congested network, the access points in the network continue to provide high quality service to the client devices running various applications.

For illustration purposes only, assuming that an AP has a limited capacity of serving ten clients. Accordingly, as long as each client device is using the network in a fair manner, e.g., with no excessive data uploads and downloads, the AP will provide good network service for all of the ten client devices. Now, assuming that one of the client devices starts a large amount of data download, which causes the AP to devote a lot of bandwidth to service the particular client device. Therefore, the remaining nine client devices will experience various levels of delay of service from the AP. If one of the nine remaining client devices is running a voice application or on an active voice call, the voice client will likely experience many packet losses and suffer from poor call quality. When the AP detects such quality degradation, the AP will start to block traffic for all of the client devices to improve its service quality.

Trigger of Voice Call Handling Mechanisms

According to embodiments of the present disclosure, to avoid the above described scenarios, an AP may calculate a utilization ratio, including but not limited to, a processor utilization ratio, a length of queue in buffer, a radio utilization ratio, etc. Therefore, instead of waiting for the voice call quality to start to degrade, the AP can proactively determine whether the AP's utilization ratio has exceeded a predetermined threshold level, and thus likely to lead to voice call quality degradation. As a result, the AP can trigger one or more voice call handling mechanisms to prevent the degradation of voice call quality.

In addition, the AP can monitor active voice and/or video call quality by performing a Real-time Transport Protocol (RTP) analysis, and obtain parameters including packet loss, delay, jitter, etc., for determining the real-time call quality for a particular client. The AP will trigger one or more voice call handling mechanisms if the AP detects a degradation of voice call quality without the AP's utilization ratio exceeding the threshold, e.g., when the AP is not oversubscribed but the network has an interference.

In some embodiments, the APs will have an upper threshold and a lower threshold of AP utilization. For example, an AP may be configured with an upper threshold of 80% utilization and a lower threshold of 20% utilization. When the AP detects that the AP's current utilization ratio exceeds the preconfigured upper threshold (i.e., 80%), the AP will start moving some clients to other neighboring APs to lower its utilization ratio to a value below the preconfigured upper threshold (i.e., 80%).

Moreover, the APs in the network can be preconfigured with a limit of a maximum number of times that a particular client can be moved to a different AP in the network. In addition, the AP can monitor the total number of voice clients, as well as maintaining an upper limit and/or a lower limit of active voice call clients. The AP will trigger one or more of the voice call handling mechanisms if the total number of voice clients is higher than the upper limit. On the other hand, the AP will not move any more clients to other APs if the current total number of voice clients is less than the lower limit. These preconfigured limits help preventing a particular voice client from being moved around to among multiple APs in a congested network.

The following sections describe various ways of voice call handling by the AP such that the voice client will not suffer the degradation of voice call quality during network congestions.

Voice Call Handling Mechanism Based on Client Roaming Compatibility

Figure 2A:
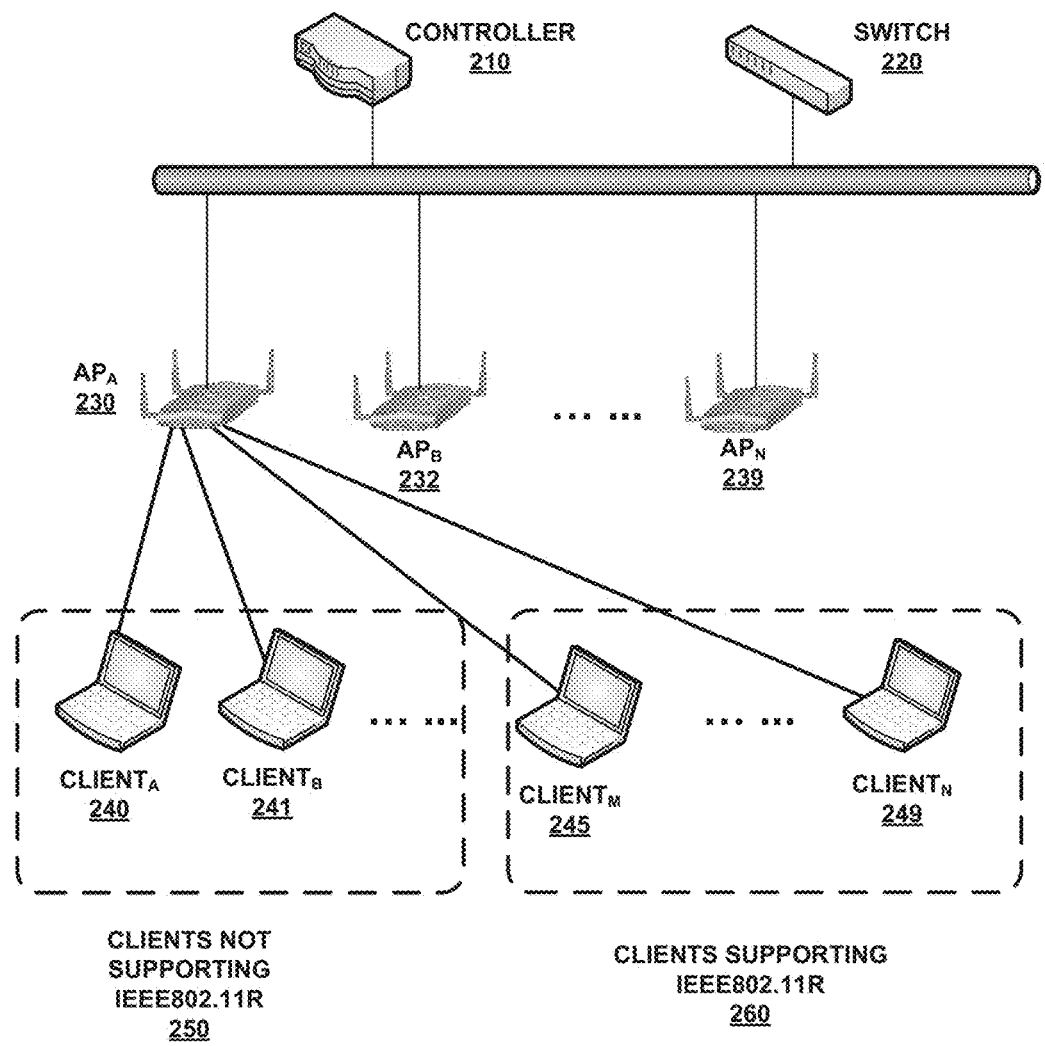
FIGS. 2A-2B show exemplary network diagrams illustrating an exemplary client move according to embodiments of the present disclosure.
Figure 2B:
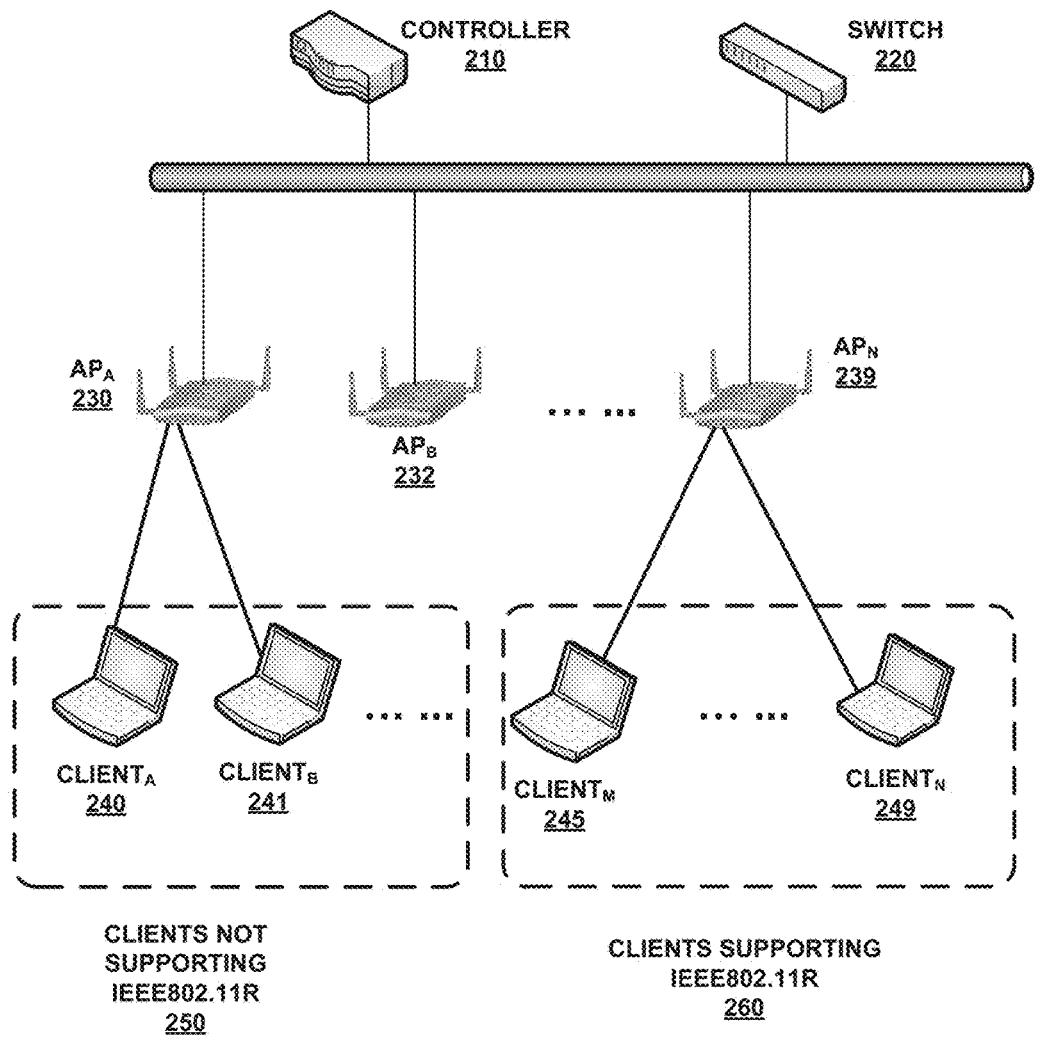

FIGS. 2A-2B show exemplary network diagrams illustrating an exemplary client move according to embodiments of the present disclosure. Specifically, FIGS. 2A-2B illustrate a network that includes at least a switch 220, a network controller 210, and a plurality of network devices, such as $AP_A$ 230, $AP_B$ 232, . . . , $AP_N$ 239. Furthermore, multiple client devices are associated with each access point. For example, $Client_A$ 240, $Client_B$ 241, . . . $Client_M$ 245, . . . $Client_N$ 149 are associated with $AP_A$ 230.

Some client devices support IEEE 802.11r standard (e.g., clients supporting IEEE 802.11r 260 as illustrated), whereas other client devices do not support IEEE 802.11r standard (e.g., clients not supporting IEEE 802.11r 250 as illustrated). IEEE 802.11r standard is an industry standard for fast basic service set (BSS) transition (FT) to permit continuous connectivity aboard wireless devices in motion, with fast and secure handoffs from one access point to another managed in a seamless manner with no noticeable impact on an active voice call. For clients that are compliant with IEEE 802.11r standard (e.g. clients 260), it is possible to move the active voice clients to a different access point (e.g., $AP_N$ 239), because the IEEE 802.11r standard specification mandates that roaming of the client should not cause a noticeable disruption of the voice quality.

As illustrated in FIG. 2A, initially, all client devices are associated with $AP_A$ 230. When this voice call handling mechanism is triggered, a network device (such as $AP_A$ 230 and/or controller 210) can determine a set of voice clients that support IEEE 802.11r standard 260. Thus, if an active voice client supports IEEE 802.11r standard, the AP will use the fast BSS transition protocol as specified by the 11r standard to guide the active voice client to associate with another AP, whereas the other AP has sufficient resources and bandwidth to support the quality required by the active voice client. As illustrated in FIG. 2B, $AP_A$ 230 identifies $Client_M$ 245 to $Client_N$ 249 as active voice clients supporting IEEE 802.11r standard, and therefore guides these clients to associate with $AP_N$ 239 in its neighborhood.

In some embodiments, the AP will also determine which client devices support IEEE 802.11v standard. IEEE 802.11v is a Wireless Network Management standard that allows client devices to exchange information about the network topology, including information about the RF environment, making each client network aware, facilitating overall improvement of the wireless network. The AP can use .11v techniques to notify a client device about availability of its neighboring APs that support BSS fast transition, and advice that the client device to roam to a neighboring AP. When the client device subsequently determines to the neighboring AP through BSS FT, the client device and the neighboring AP do not need to complete the conventional four-way handshake protocol, and thus can complete the roaming process within a very short period of time. In some embodiments, when a client device does not support .11v standard, the AP will initiate a de-authentication process and blacklist the client device, such that the client device cannot re-associate with the same AP after disassociation and will associate with its neighboring AP.

Voice Call Handling Based on Heavy Data Usage

Figure 3A:
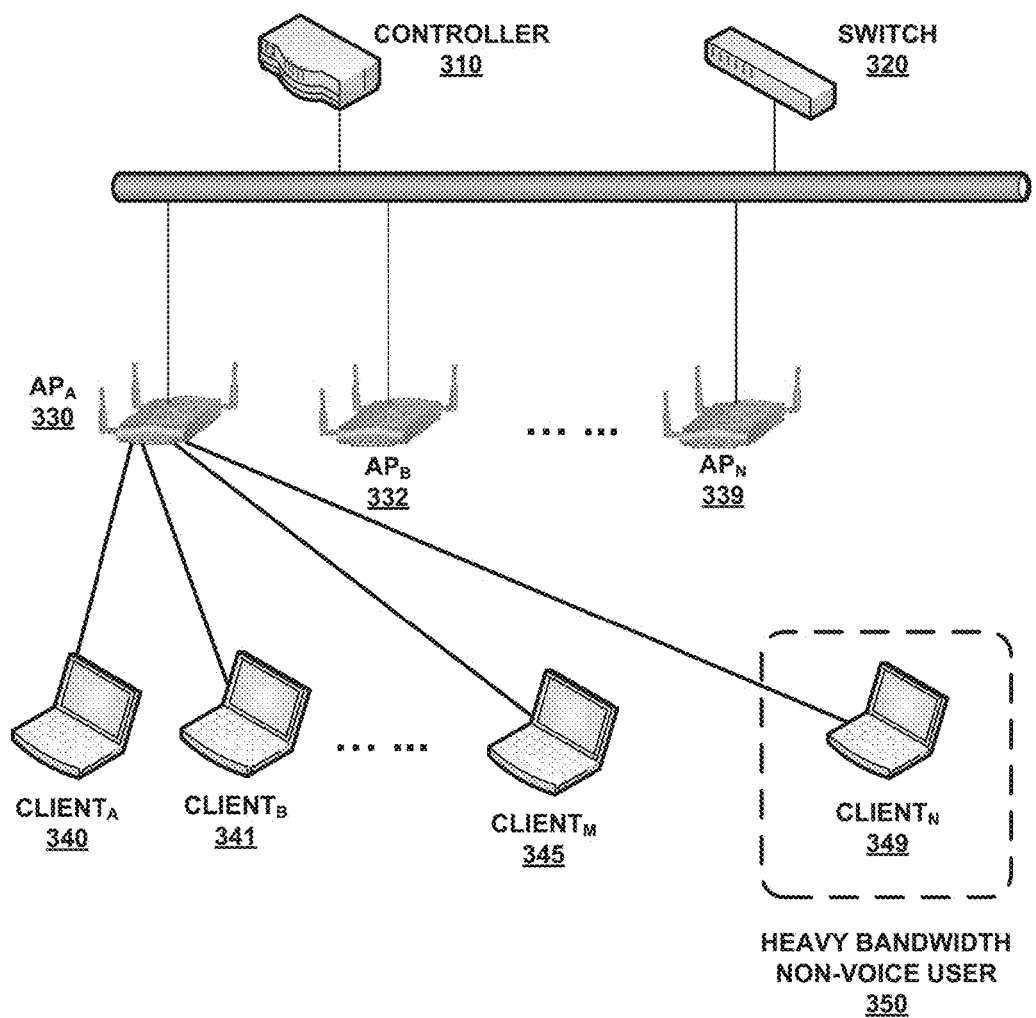
FIGS. 3A-3B show exemplary network diagrams illustrating an exemplary client move according to embodiments of the present disclosure.
Figure 3B:
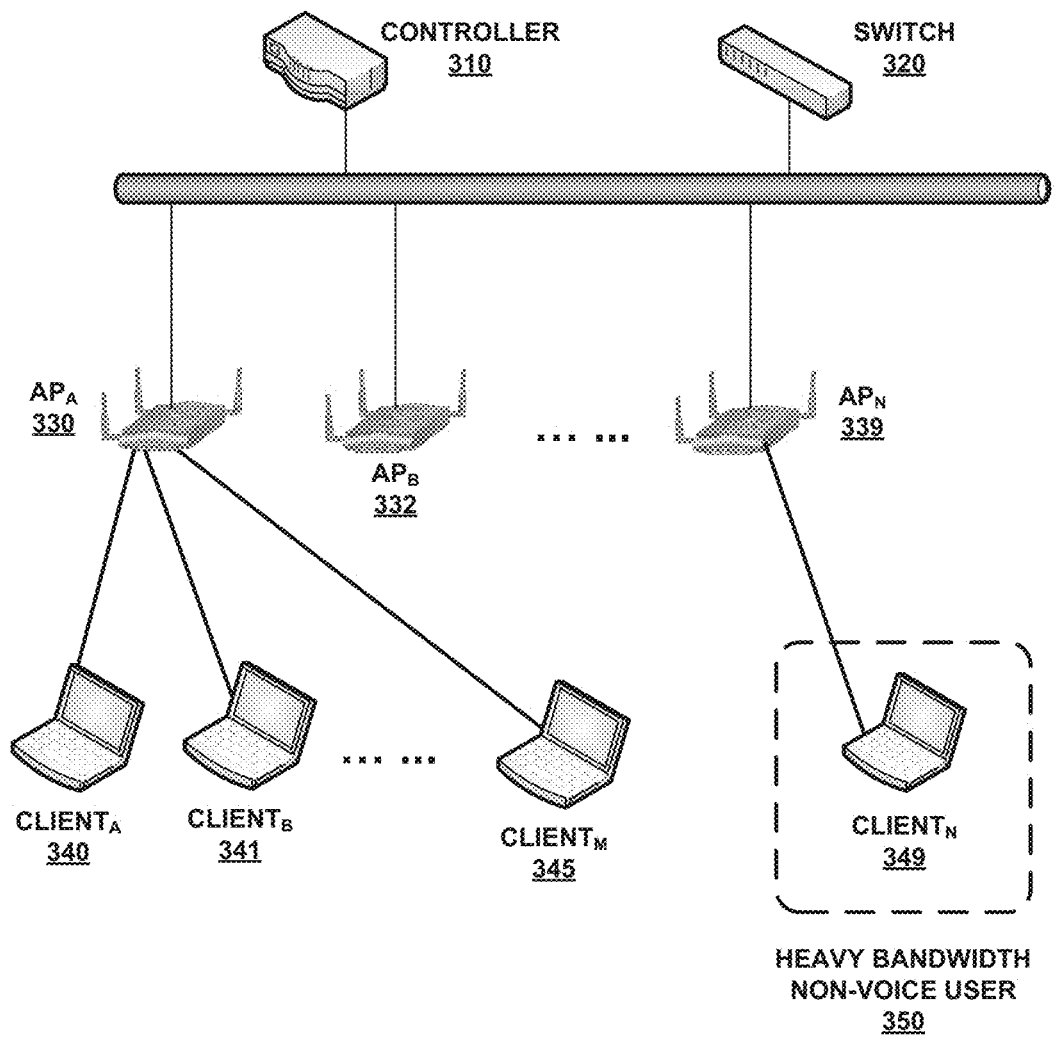

FIGS. 3A-3B show exemplary network diagrams illustrating an exemplary client move according to embodiments of the present disclosure. Specifically, FIGS. 3A-3B illustrate a network that includes at least a switch 320, a network controller 310, and a plurality of network devices, such as $AP_A$ 330, $AP_B$ 332, . . . , $AP_N$ 339. Furthermore, multiple client devices are associated with each access point. For example, $Client_A$ 340, $Client_B$ 341, . . . $Client_M$ 345, and $Client_N$ 349 are associated with $AP_A$ 330.

As illustrated in FIG. 3A, initially, all client devices are associated with $AP_A$ 330. When this voice call handling mechanism is triggered, a network device (such as $AP_A$ 330 and/or controller 310) can determine one or more non-voice client devices that are involved in heavy bandwidth usage, for example, by uploading and/or downloading a large amount of data, and guide these non-voice client devices to a different AP. Specifically, in FIG. 3A, $AP_A$ 330 identifies $Client_N$ 349 as a heavy bandwidth non-voice user 350. As illustrated in FIG. 3B, $AP_A$ 330 will guide the heavy bandwidth non-voice $Client_N$ 349 to associate with $AP_N$ 339 in its neighborhood.

Voice Call Handling Based on Low Signal Strength Level

Figure 4A:
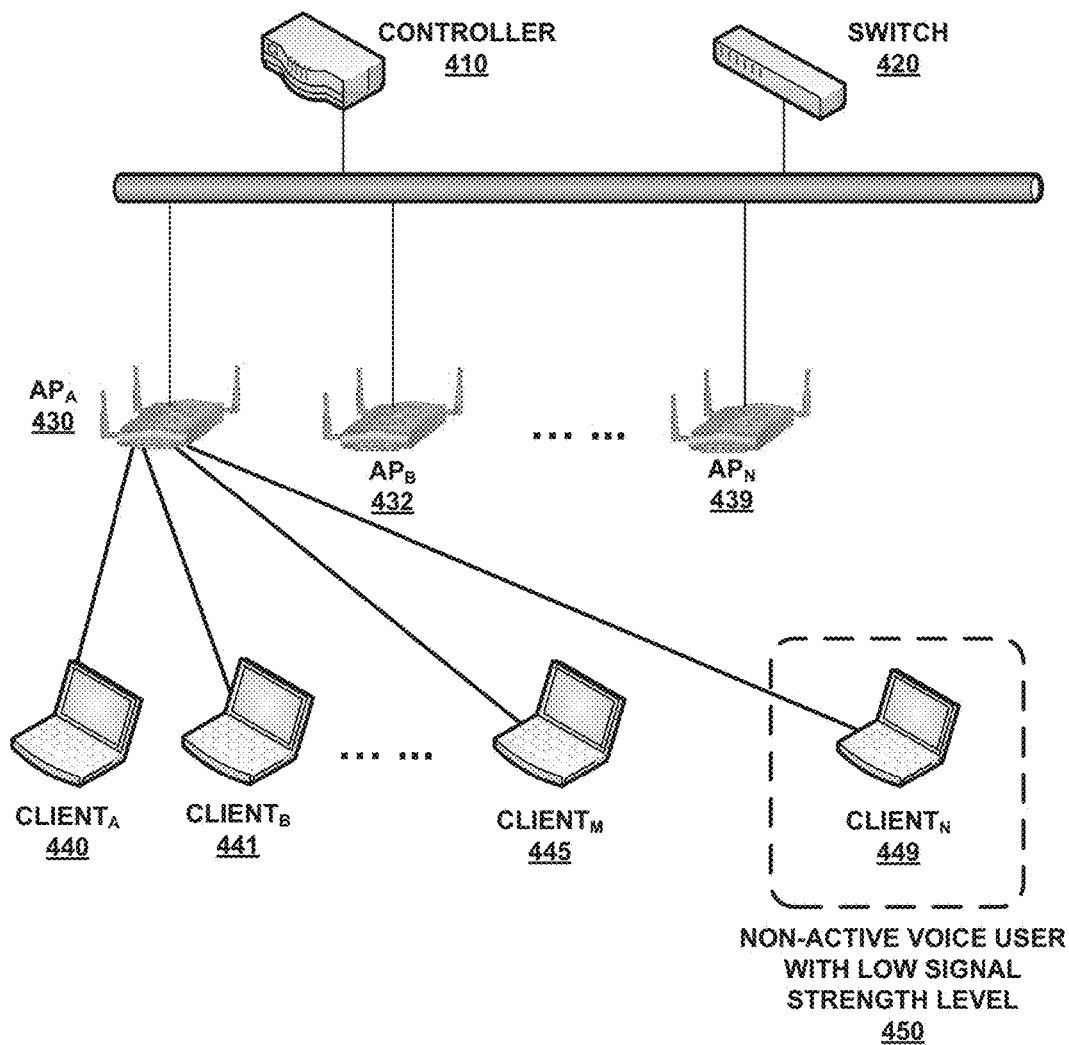
FIGS. 4A-4B show exemplary network diagrams illustrating an exemplary client move according to embodiments of the present disclosure.
Figure 4B:
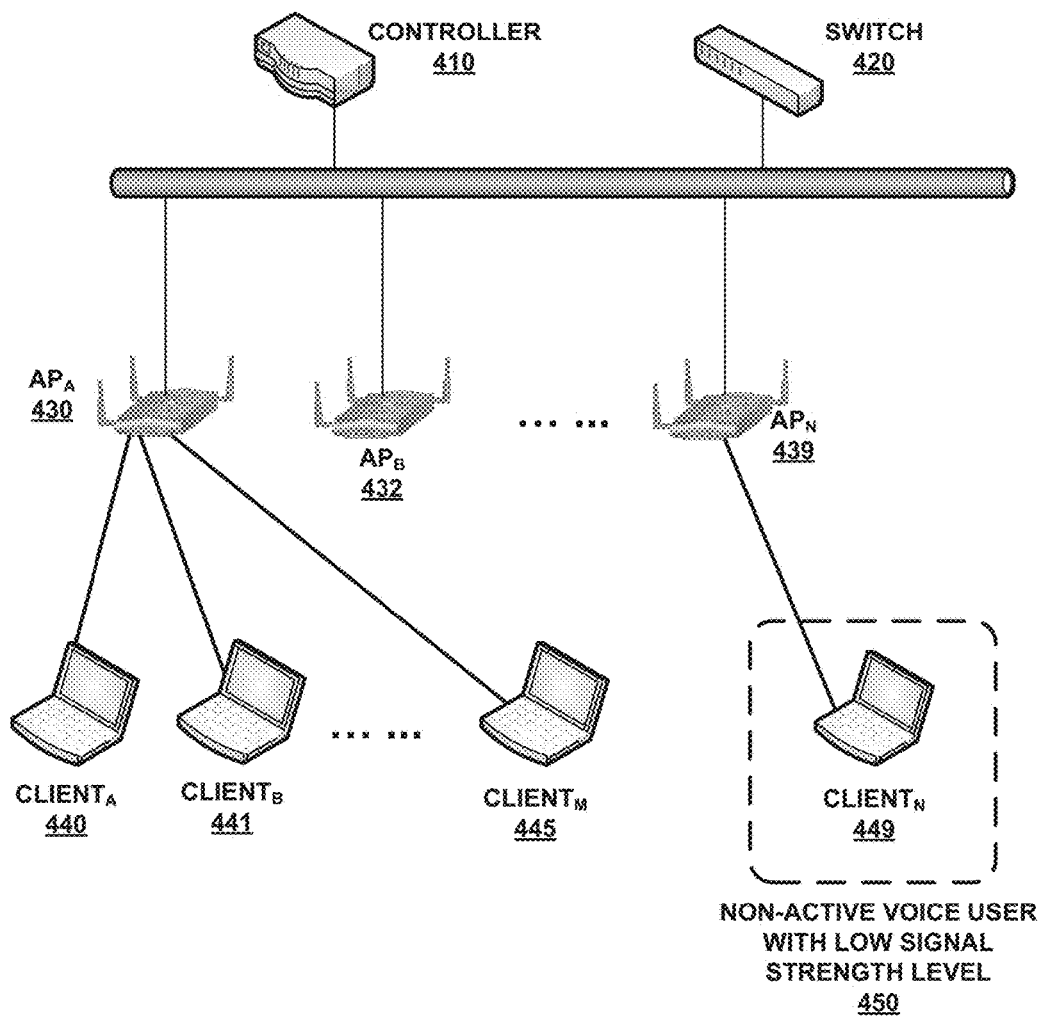

FIGS. 4A-4B show exemplary network diagrams illustrating an exemplary client move according to embodiments of the present disclosure. Specifically, FIGS. 4A-4B illustrate a network that includes at least a switch 420, a network controller 410, and a plurality of network devices, such as $AP_A$ 430, $AP_B$ 432, . . . , $AP_N$ 439. Furthermore, multiple client devices are associated with each access point. For example, $Client_A$ 440, $Client_B$ 441, . . . $Client_M$ 445, and $Client_N$ 449 are associated with $AP_A$ 430.

As illustrated in FIG. 4A, initially, all client devices are associated with $AP_A$ 430. When this voice call handling mechanism is triggered, a network device (such as $AP_A$ 430 and/or controller 410) can determine one or more non-voice client devices that are associated with low signal strength levels, and guide these non-voice client devices to a different AP. Specifically, in FIG. 4A, $AP_A$ 430 identifies $Client_N$ 449 as a non-voice user with low signal strength level 450. As illustrated in FIG. 4B, $AP_A$ 430 will guide the non-voice Client$_N$ 449 with low signal strength level to associate with another AP, such as, AP$_N$ 439, in its neighborhood for better signal qualities.

Voice Call Handling Based on Priority of Voice Users

Figure 5A:
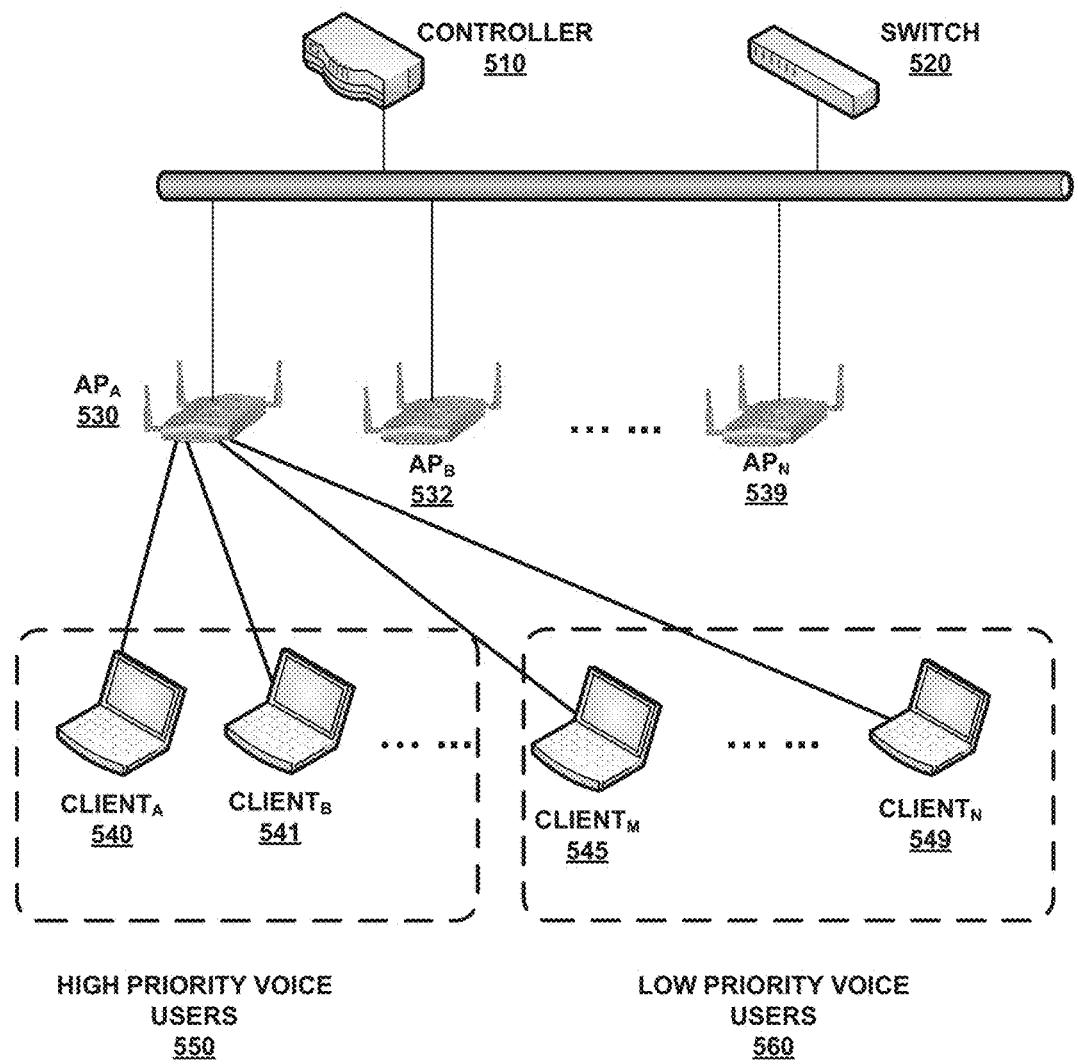
FIGS. 5A-5B show exemplary network diagrams illustrating an exemplary client move according to embodiments of the present disclosure.
Figure 5B:
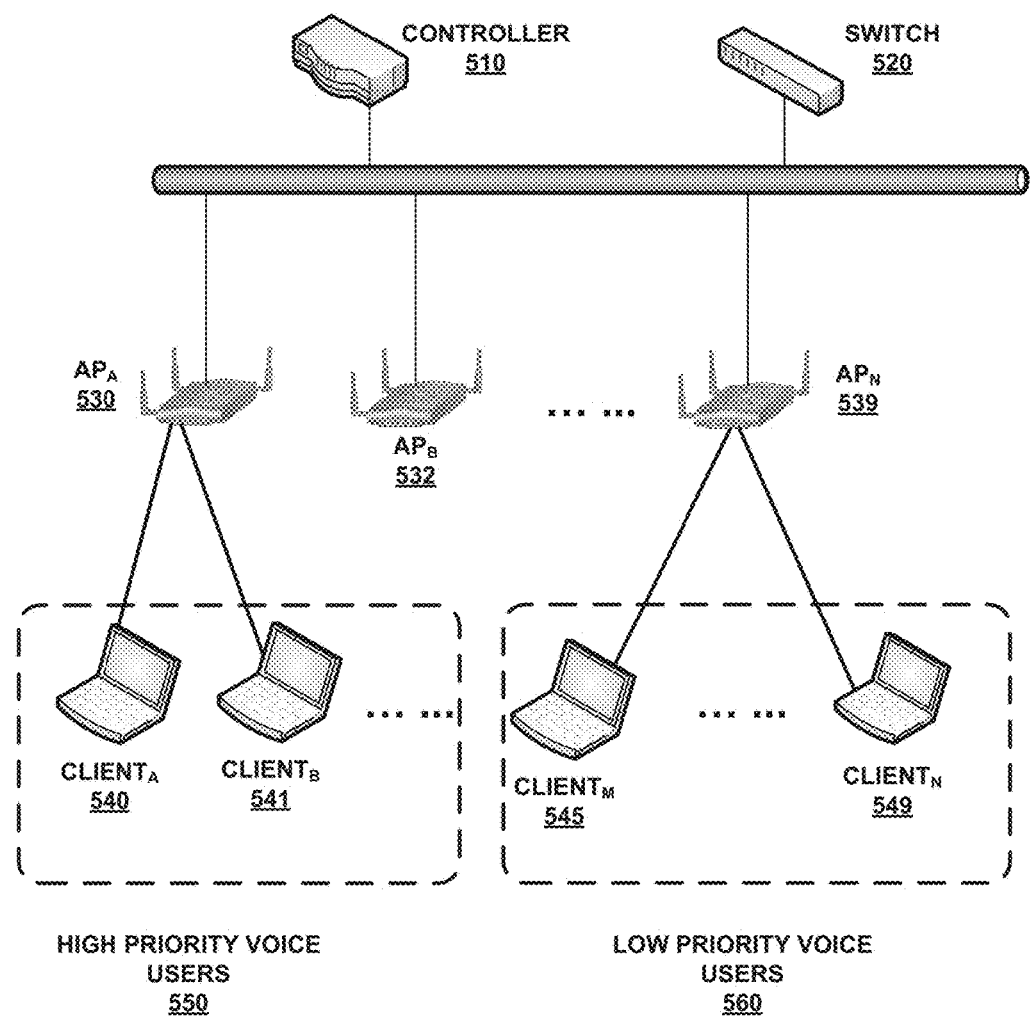

FIGS. 5A-5B show exemplary network diagrams illustrating an exemplary client move according to embodiments of the present disclosure. Specifically, FIGS. 5A-5B illustrate a network that includes at least a switch 520, a network controller 510, and a plurality of network devices, such as AP$_A$ 530, AP$_B$ 532, . . . , AP$_N$ 539. Furthermore, multiple client devices are associated with each access point. For example, Client$_A$ 540, Client$_B$ 541, . . . Client$_M$ 545, . . . Client$_N$ 549 are associated with AP$_A$ 530.

As illustrated in FIG. 5A, initially, all client devices are associated with AP$_A$ 530. When this voice call handling mechanism is triggered, a network device (such as AP$_A$ 530 and/or controller 510) can determine one or more client devices that are in active voice calls but are associated with a user role of a low priority. According to embodiments of the present disclosure, AP$_A$ 530 can provide differential treatments to all voice call clients based on a respective user role associated with each voice call client. For example, a network administrator may configure the system to provide better voice call quality to employees of an organization than visitors of the organization. When AP$_A$ 530 cannot successfully identify a particular client device or a particular set of client devices that cause the network congestion, but AP$_A$ 530's utilization ratio exceeds the upper threshold limit, AP$_A$ 530 can guide voice client devices associated with low priority users to a different AP. Specifically, in FIG. 5A, AP$_A$ 530 identifies Client$_M$ 545 to Client$_N$ 549 as a set of voice clients associated with low priority users 560, whereas Client$_A$ 540, Client$_B$ 541, etc., are a set of voice clients associated with high priority users 550. As illustrated in FIG. 5B, AP$_A$ 530 will guide voice client devices associated with low priority voice users 560, such as Client$_M$ 545 to Client$_N$ 549, to associate with another AP, such as, AP$_N$ 539. Hence, the remaining client devices, such as, Client$_A$ 540, Client$_B$ 541, etc., that are associated with high priority voice users 550 will experience improved voice call quality.

Voice Call Handling Based on Geo-Fence Location

Figure 6A:
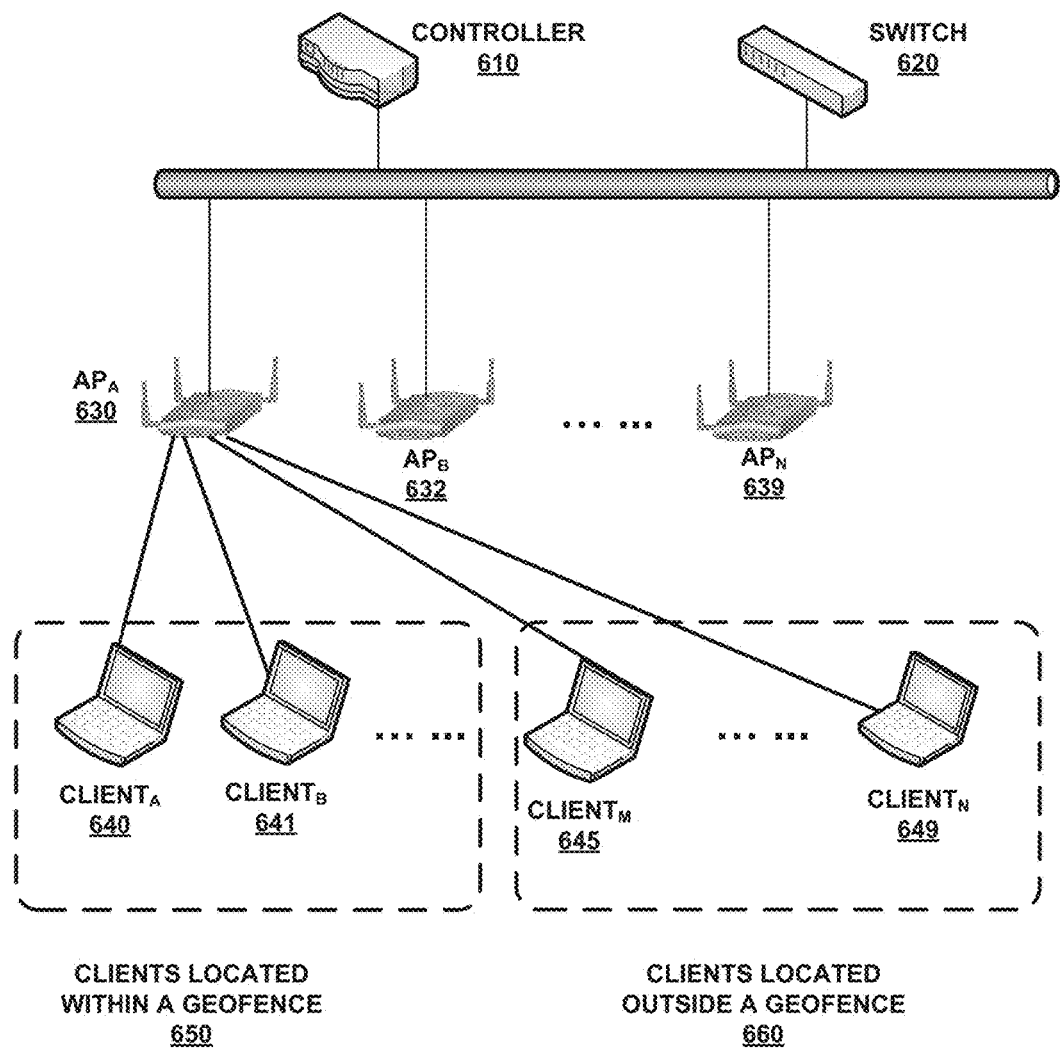
FIGS. 6A-6B show exemplary network diagrams illustrating an exemplary client move according to embodiments of the present disclosure.
Figure 6B:
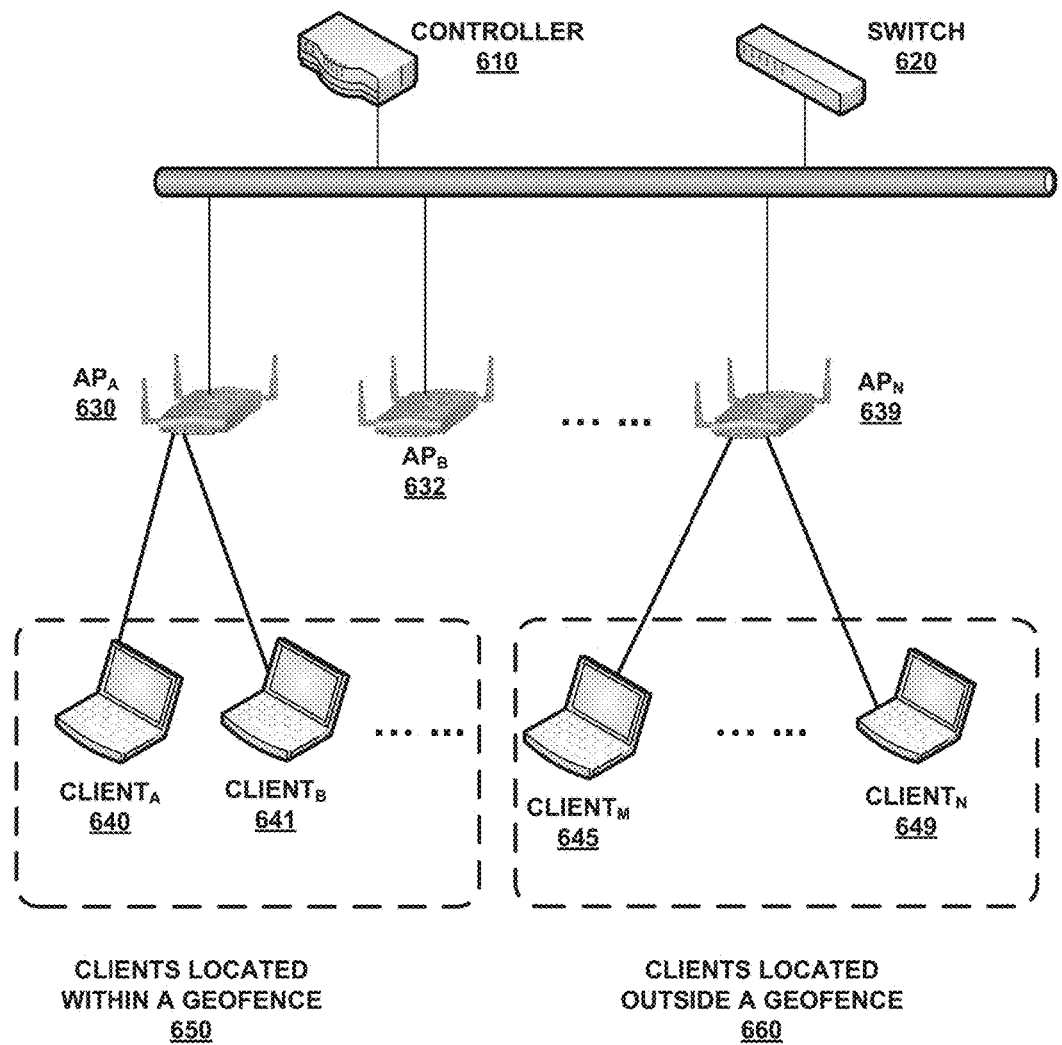

FIGS. 6A-6B show exemplary network diagrams illustrating an exemplary client move according to embodiments of the present disclosure. Specifically, FIGS. 6A-6B illustrate a network that includes at least a switch 620, a network controller 610, and a plurality of network devices, such as AP$_A$ 630, AP$_B$ 632, . . . , AP$_N$ 639. Furthermore, multiple client devices are associated with each access point. For example, Client$_A$ 640, Client$_B$ 641, . . . Client$_M$ 645, . . . Client$_N$ 649 are associated with AP$_A$ 630. In this example, for illustration purposes only, the geo-fence may be a particular conference room in a facility. Some client devices (e.g., Client$_A$ 640, Client$_B$ 641, etc.) are located within the conference room, whereas other client devices (e.g., Client$_M$ 645 to Client$_N$ 649) are located outside the conference room but close enough in proximity to be associated with the APs within the conference room.

As illustrated in FIG. 6A, initially, all client devices are associated with AP$_A$ 630. When this voice call handling mechanism is triggered, a network device (such as AP$_A$ 630 and/or controller 610) can determine one or more client devices that are located within a geo-fence. A geo-fence generally refers to a virtual perimeter for a real-world geographic area. The geo-fence could be dynamically generated, e.g., as in a radius around a store or point location. Alternatively, a geo-fence can be a predefined set of boundaries, e.g., school attendance zones and/or neighborhood boundaries.

Specifically, in FIG. 6A, AP$_A$ 630 identifies Client$_M$ 645 to Client$_N$ 649 as a set of client devices located outside a geo-fence 660, whereas Client$_A$ 640, Client$_B$ 641, etc., are a set of client devices located within a geo-fence 650. When AP$_A$ 630 cannot successfully identify a particular client device or a particular set of client devices that cause the network congestion, but AP$_A$ 630's utilization ratio exceeds the upper threshold limit, AP$_A$ 630 can guide client devices located outside a geo-fence to a different AP. As illustrated in FIG. 6B, AP$_A$ 630 will guide client devices located outside a geo-fence 560, such as Client$_M$ 645 to Client$_N$ 649, to associate with another AP, such as, AP$_N$ 639. Hence, the remaining client devices, such as, Client$_A$ 5640, Client$_B$ 641, etc., that are located within the geo-fence 650 will experience improved voice call quality.

Voice Call Handling Based on Application/Session Information

Traditional layer-3 and/or layer-4 firewall, which inspect a 5-tuple to allow and/or deny sessions can do so upon the receipt of the first packet in a session. For example, receipt of the first packet over a User Datagram Protocol (UDP) session or Transmission Control Protocol (TCP) SYN for TCP session is enough for an AP/controller to allow and/or deny the session.

However, a Deep Packet Inspection (DPI) engine running on a network controller cannot classify the session upon the receipt of first packet for TCP sessions. Depending on the complexity of the application, the network controller needs one or more data packets to classify the session as a particular application. The DPI engine generates an event when the session is partially classified or terminally classified.

When a new session is created, the network controller performs a DPI to determine the application type that the session belongs to. Because not all applications are classified as belonging to a particular application on the receipt of a first data packet, the network controller packets to classify a session in the worst case. When the session is partially classified, it implies that the DPI engine needs more data packets to determine the final classification for the session. Once the session is terminally classified, the session is finally marked with the corresponding application identifier.

FIG. 7 shows exemplary application information and categories according to embodiments of the present disclosure. FIG. 7 includes at least an application field 710, an application category field 720, an access category field 730, and a priority field 740.

Application field 710 indicates the specific application, e.g., GMail®, BitTorrent®, eDonkey®, Yahoo® Messenger, WhatsApp®, WeChat®, Twitter®, Facebook®, Youtube®, Netflix®, Skype®, GoToMeeting®, WebEx®, Adobe-Connect®, Lync® video, GTalk®, Jabber®, Lync® audio, etc.

Application category field 720 indicates the category corresponding to each application, including but not limited to, webmail, web, instant messaging, peer-to-peer, audio-video, etc.

Access category field 730 indicates a corresponding service category for each application. Note that, IEEE 802.11e standard specifies the following four access-categories for classifying various traffic types: (1) Voice, (2) Video, (3) Best-effort, and (4) Background.

Furthermore, an application can be categorized as an enterprise application used heavily for business needs, or a non-enterprise application, used by employees for personal needs. All applications can be categorized as enterprise or non-application application based on their importance to an organization. In addition, because a voice application is sensitive to latency and/or jitter rather than bandwidth, all voice applications can be put in one single category. On the other hand, a video application requiring high bandwidths can be categorized into (a) streaming, (b) enterprise online-conference, and/or (c) personal online-conference.

Thus, all the applications can be categorized into a number of categories, including but not limited to, background access, best effort access, non-enterprise video access, enterprise video access, voice access, etc. A network controller can maintain the application and/or application-category to access-category mapping table shown in FIG. 7 for all applications and application-categories supported in the system. This exemplary mapping can be overridden or replaced by an enterprise customer, and thus providing the flexibility to a network administrator to define its own customized mappings.

Once the session is terminally classified as belonging to a particular application, the network controller's stateful firewall architecture can map the session to one of these five access categories based on the application to which this session is classified as.

The network controller can maintain a new lookup table, indexed on client's MAC address, which includes the number of sessions falling in the five access categories, currently in transit for each client. Once the session is terminally classified as a particular application, depending on the application-to-access-category mapping, the corresponding counter is incremented for the client device executing the particular application. Similarly, when the session is timed out, the corresponding counter is decremented for the client device.

FIG. 8 shows exemplary session information and categories according to embodiments of the present disclosure. FIG. 8 includes a table having entries with at least a client Media Access Control (MAC) address 810, number of sessions 820. Further, the number of sessions 820 can be sub-categorized into five access categories, namely, voice 830, enterprise video 840, non-enterprise video 850, best effort 860, and background 870. As illustrated in FIG. 8, the client device with MAC address of AA:BB:CC:DD:EE:01 has a number of applications running on the device. Among them, two applications are categorized as non-enterprise video 850; five applications are categorized as best effort 860; and ten applications are categorized as background 870.

In some embodiments, the network controller maintains a new lookup table as illustrated in FIG. 9, indexed on AP, called "AP Access Category Table." The AP Access Category Table lists the total number of sessions falling in these five access categories for all client devices associated to AP. When a session is terminally classified as a particular application, depending on the application-to-access-category mapping, the corresponding counter is incremented for the AP to which the client device is associated to. Similarly when the session is timed out, the corresponding counter is decremented for the client device.

Once a particular AP is marked for load balancing, the network controller can perform a lookup in a Client Access Category Table to find the list of all clients connected to the particular AP and select one or more clients to steer to another neighboring AR. To steer a client to the neighboring AP, the one or more clients need to meet the following two requirements: (a) The clients should not be handling any latency sensitive sessions, such as, voice applications; and (b) The clients should have decent SNR value for the neighboring AP. Once a client is found with the above two properties, it can be guided by the particular AP to associate with a neighboring AP.

FIG. 9 includes at least an access point field 910, a number of sessions field 920, and a load factor field 990. Further, the number of sessions 920 can be sub-categorized into five access categories, namely, voice 930, enterprise video 940, non-enterprise video 950, best effort 960, and background 970.

Controller can assign a weightage for each access category, which is configurable by a network administrator. The load factor for each AP is determined by the number of active sessions belonging to each access category and the weightage given to each access category.

For example, assuming that an AP is currently handling multiple voice, video, best effort and background sessions, then the following formula can be used to determine the load factor on the AP at the moment:

$$P*w_{vo}+Q*w_{vi}+R*w_{be}+S*w_{bg}=N$$

where P indicates a total number of voice category sessions currently handled by the AP; Q indicates a total number of enterprise video category sessions currently handled by the AP; R indicates a total number of non-enterprise video category sessions currently handled by the AP; S indicates a total number of best effort category sessions currently handled by AP; and T indicates a total number of background category sessions currently handled by AP. Furthermore, $w_{vo}$ indicates a weightage for voice access category session; $w_{evi}$ indicates a weightage for enterprise video access category session; $w_{pvi}$ indicates a weightage for non-enterprise video access category session; $w_{be}$ indicates a weightage for best-effort access category session; $w_{bg}$ indicates a weightage for back-ground access category session; and N indicates the load factor of the AR. In the example illustrated in FIG. 9B, $w_{vo}$ is preconfigured to be 4; $w_{evi}$ is preconfigured to be 20; $w_{pvi}$ is preconfigured to be 10; $w_{be}$ is preconfigured to be 2; and $w_{be}$ is preconfigured to be 1.

The network controller periodically scans through AP Access Category Table to check whether there is any skew in the load distribution of clients among the APs in the network. To do this, the network controller uses the load factor instead of the number of connected clients as a key indicator, because the load factor provides more granular real-time load information as currently handled by the APs. Based on each AP's capacity, if the AP is found to be handling close to a threshold while other APs are found to be lightly loaded, the network controller will perform a lookup of Client Access Category Table to find the list of all clients connected to this AP. Moreover, the network controller can determine the clients which are not handling any latency sensitive sessions, and which have decent SNR values for other APs. The network controller will then mark such clients for steering.

Figure 10A:
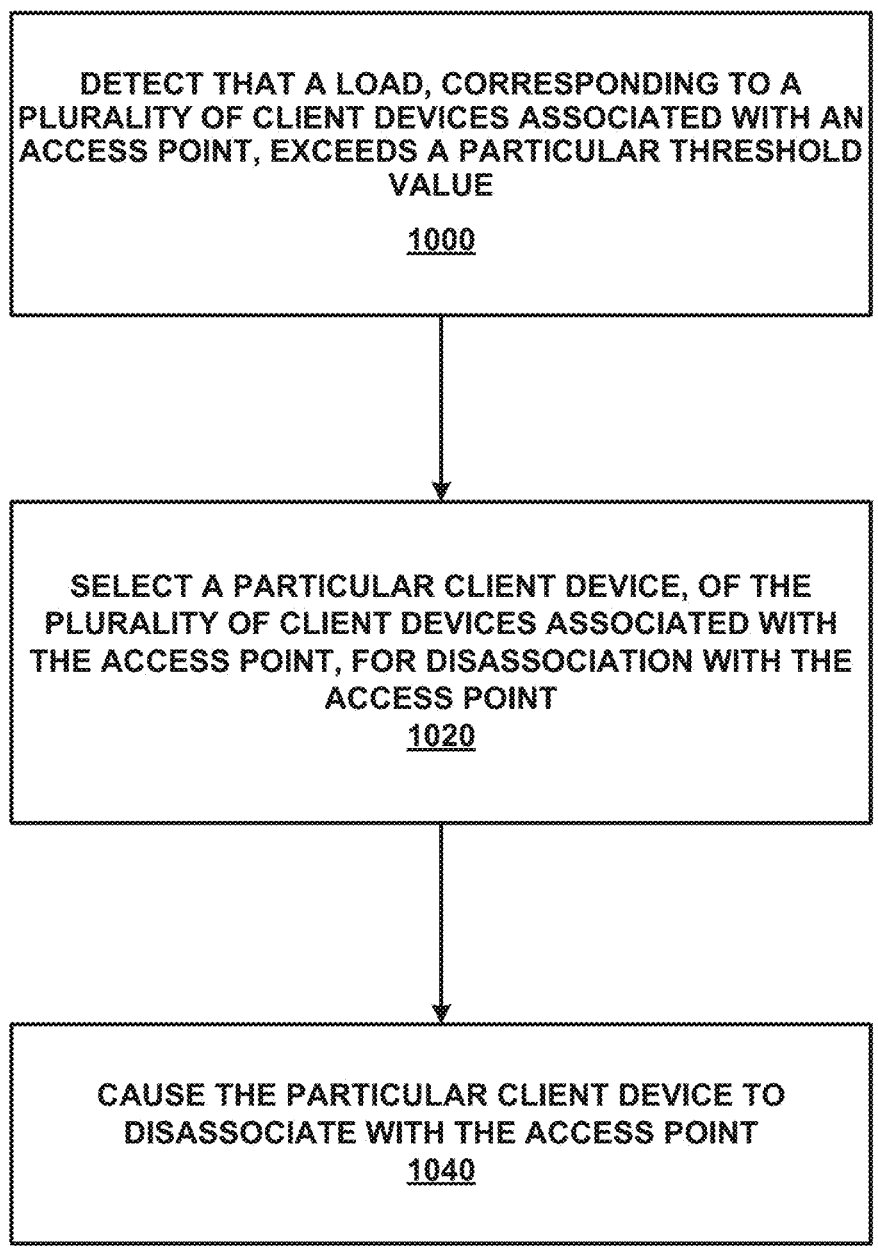
FIGS. 10A-10B illustrate exemplary processes for intelligent handling of voice calls from mobile voice client devices according to embodiments of the present disclosure.

Processes for Intelligent Handling of Voice Calls from Mobile Voice Client Devices FIG. 10A illustrates an exemplary process for intelligent handling of voice calls from mobile voice client devices according to embodiments of the present disclosure. First, a network device detects that a load, corresponding to a plurality of client devices associated with an access point, exceeds a particular threshold value (operation 1000). In response, the network device selects a particular client device, of the plurality of client devices associated with the access point, for disassociation with the access point (operation 1020). The network device then causes the particular client device to disassociate with the access point (operation 1040).

Figure 10B:
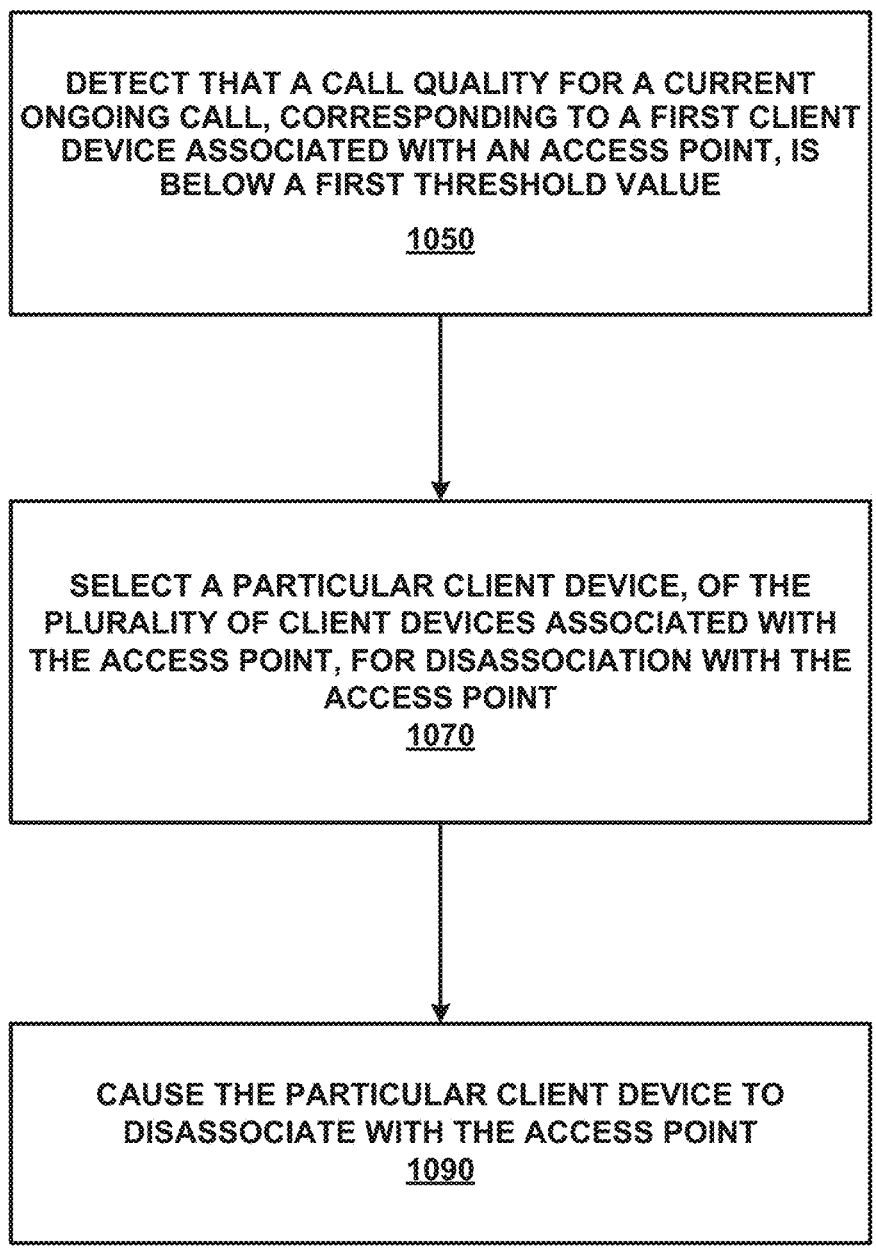

FIG. 10B illustrates another exemplary process for intelligent handling of voice calls from mobile voice client devices according to embodiments of the present disclosure. Here, the network device first detects that a call quality for a current ongoing call, corresponding to a first client device associated with an access point, is below a first threshold value (operation 1050). In response, the network device selects a particular client device, of the plurality of client devices associated with the access point, for disassociation with the access point (operation 1070). The network device then causes the particular client device to disassociate with the access point (operation 1090).

In some embodiments, the particular client device is selected for disassociation with the access point responsive to determining that the particular client device is not on any current ongoing voice call. In some embodiments, the particular client device is selected for disassociation with the access point responsive to determining that the particular client device has a level of data traffic above a second threshold value and that the particular client device is not on any current ongoing voice call.

In some embodiments, the load corresponding to the plurality of client devices associated with the access point is determined based on a utilization level for one or more components of the access point. In some embodiments, the call quality is determined based on one or more of: a detected level of interference, a data throughput level for the current ongoing level, or a dropped packet rate for the current ongoing level.

In some embodiments, the particular client device is selected for disassociation with the access point responsive to determining that the particular client device is compliant with IEEE 802.11r and/or IEEE 802.11v standards.

In some embodiments, the particular client device is selected for disassociation with the access point based on a user role or priority associated with the particular client device.

In some embodiments, the particular client device is selected for disassociation with the access point based on a signal quality value for a wireless connection between particular client device and the access point.

In some embodiments, the particular client device is selected for disassociation with the access point responsive to determining that a maximum number of disassociations caused for the particular client device by a set of access points have not been reached.

In some embodiments, the particular client device is selected for disassociation with the access point based on a location of the particular client device.

In some embodiments, the particular client device is selected for disassociation with the access point based on applications currently executing on the particular client device.

In some embodiments, the network device also causes additional client devices of the plurality of client devices to disassociate with the access point until (a) the load, corresponding to a plurality of client devices associated with an access point, decreases to below the particular threshold value or (b) the load, corresponding to a plurality of client devices associated with an access point, decreases to below a second threshold value.

System for Intelligent Handling of Voice Calls from Mobile Voice Client Devices

Figure 11:
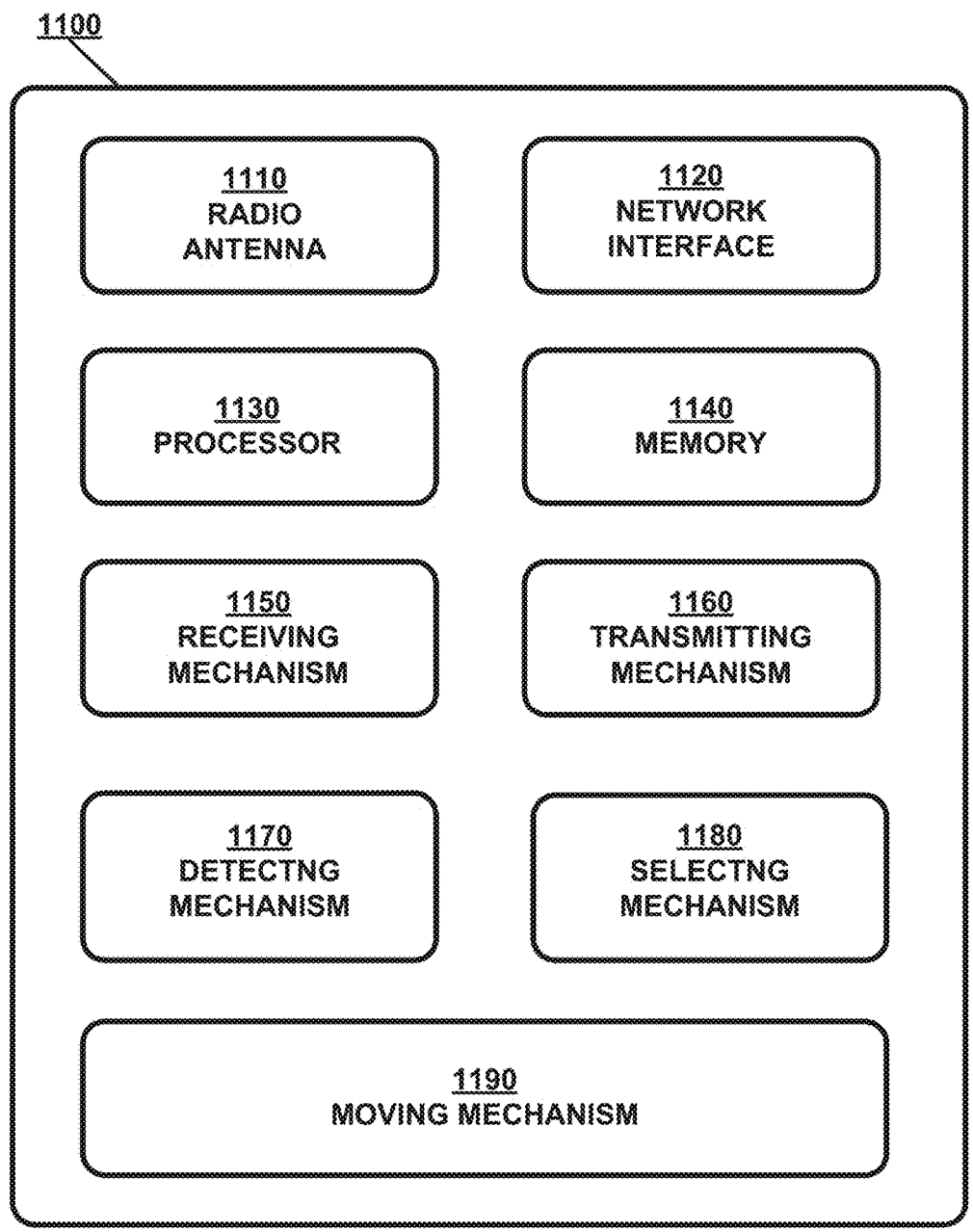
FIG. 11 is a block diagram illustrating an exemplary system for intelligent handling of voice calls from mobile voice client devices according to embodiments of the present disclosure.

FIG. 11 is a block diagram illustrating a system for intelligent handling of voice calls from mobile voice client devices. Network device 1100 includes at least one or more radio antennas 1110 capable of either transmitting or receiving radio signals or both, a network interface 1120 capable of communicating to a wired or wireless network, a processor 1130 capable of processing computing instructions, and a memory 1140 capable of storing instructions and data. Moreover, network device 1100 further includes a receiving mechanism 1150, a transmitting mechanism 1160, a detecting mechanism 1170, a selecting mechanism 1180, and a moving mechanism 1190, all of which are in communication with processor 1130 and/or memory 1140 in network device 1100. Network device 1100 may be used as a client system, or a server system, or may serve both as a client and a server in a distributed or a cloud computing environment.

Radio antenna 1110 may be any combination of known or conventional electrical components for receipt of signaling, including but not limited to, transistors, capacitors, resistors, multiplexers, wiring, registers, diodes or any other electrical components known or later become known.

Network interface 1120 can be any communication interface, which includes but is not limited to, a modem, token ring interface, Ethernet interface, wireless IEEE 802.11 interface, cellular wireless interface, satellite transmission interface, or any other interface for coupling network devices.

Processor 1130 can include one or more microprocessors and/or network processors. Memory 1140 can include storage components, such as, Dynamic Random Access Memory (DRAM), Static Random Access Memory (SRAM), etc.

Receiving mechanism 1150 generally receives one or more network messages via network interface 1120 or radio antenna 1110 from a wireless client. The received network messages may include, but are not limited to, requests and/or responses, beacon frames, management frames, control path frames, and so on.

Transmitting mechanism 1160 generally transmits messages, which include, but are not limited to, requests and/or responses, beacon frames, management frames, control path frames, and so on.

Detecting mechanism 1170 generally a load and/or a call quality associated with an AP or client device. Specifically, detecting mechanism 1170 can detect that a load, corresponding to a plurality of client devices associated with an access point, exceeds a particular threshold value. The load corresponding to the plurality of client devices associated with the access point is determined based on a utilization level for one or more components of the access point. Furthermore, detecting mechanism 1170 can detect that a call quality for a current ongoing call, corresponding to a first client device associated with an access point, is below a first threshold value. The call quality is determined based on one or more of: a detected level of interference, a data throughput level for the current ongoing level, or a dropped packet rate for the current ongoing level.

Selecting mechanism 1180 generally selects one or more client devices for disassociation with an access point. In some embodiments, responsive to detecting that the load exceeds the particular threshold value, selecting mechanism 1180 selects a particular client device, of the plurality of client devices associated with the access point, for disassociation with the access point. In some embodiments, responsive to detecting that a call quality for the current ongoing call is below the threshold value, selecting mechanism 1180 selects a second client device, associated with the access point, for disassociation with the access point.

In some embodiments, the client device is selected for disassociation with the access point responsive to determining that the particular client device is not on any current ongoing voice call.

In some embodiments, the client device is selected for disassociation with the access point responsive to determining that the particular client device has a level of data traffic above a second threshold value and that the particular client device is not on any current ongoing voice call.

In some embodiments, the client device is selected for disassociation with the access point responsive to determining that the particular client device is compliant with an IEEE 802.11r standard.

In some embodiments, the client device is selected for disassociation with the access point based on a user role or priority associated with the particular client device.

In some embodiments, the client device is selected for disassociation with the access point based on a signal quality value for a wireless connection between particular client device and the access point.

In some embodiments, the client device is selected for disassociation with the access point responsive to determining that a maximum number of disassociations caused for the particular client device by a set of access points have not been reached.

In some embodiments, the client device is selected for disassociation with the access point based on a location of the particular client device.

In some embodiment, the client device is selected for disassociation with the access point based on applications currently executing on the particular client device.

Moving mechanism 1190 generally causes a client device to disassociate with the access point. In some embodiments, moving mechanism 1190 causes the particular client device to disassociate with the access point responsive to determining that the particular client device is compliant with an IEEE 802.11v standard.

In some embodiments, moving mechanism 1190 causes additional client devices of the plurality of client devices to disassociate with the access point until (a) the load, corresponding to a plurality of client devices associated with an access point, decreases to below the particular threshold value or (b) the load, corresponding to a plurality of client devices associated with an access point, decreases to below a second threshold value.

In some embodiments, moving mechanism 1190 causes additional client devices of the plurality of client devices to disassociate with the access point until the call quality for the current ongoing call reaches the first threshold value or until the call quality for the current ongoing call reaches a second threshold value.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, cause the one or more hardware processors to:
    detect that a call quality for a current ongoing call corresponding to a first client device associated with an access point is below a first threshold value, wherein the call quality is determined based on a dropped packet rate for the current ongoing call; and
    responsive to detecting that a call quality for the current ongoing call is below the first threshold value:
        determine whether a second client device is a voice client on any ongoing voice call;
        determine whether the second client device is a non-voice client;
        select the second client device associated with the access point for disassociation with the access point responsive to determining that the second client device has a level of data traffic above a second threshold value and that the second client device is not on any current ongoing voice call;
        cause the second client device to disassociate with the access point in response to:
            the second client device not being on any ongoing voice call a maximum number of disassociations caused for the second client device, performed by a set of access points, has not been reached; and
            a total number of voice clients being greater than an upper limit of voice clients; and
        refrain from causing the second client device to disassociate with the access point in response to the total number of voice clients being less than a lower limit of voice clients.

2. The medium of claim 1, wherein the call quality is determined based on one or more of: a detected level of interference or a data throughput level for the current ongoing level.

3. The medium of claim 1, wherein the second client device is selected for disassociation with the access point responsive to determining that the second client device is not on any current ongoing voice call.

4. The medium of claim 1, wherein the second client device is selected for disassociation with the access point responsive to determining that the second client device is compliant with an IEEE 802.11 r standard.

5. The medium of claim 1, wherein causing the second client device to disassociate with the access point responsive to determining that the second client device is compliant with an IEEE 802.11 v standard.

6. The medium of claim 1, wherein the second client device is selected for disassociation with the access point based on a user role or priority associated with the second client device.

7. The medium of claim 1, further comprising instructions to cause the one or more hardware processors to cause additional client devices of the plurality of client devices to disassociate with the access point until the call quality for the current ongoing call reaches the first threshold value or until the call quality for the current ongoing call reaches a second threshold value.

8. The medium of claim 1, wherein the second client device is selected for disassociation with the access point based on signal quality value for a wireless connection between second client device and the access point.

9. The medium of claim 1, wherein the second client device is selected for disassociation with the access point responsive to determining that a maximum number of disassociations caused for the second client device performed by a set of access points has not been reached.

10. The medium of claim 1, wherein the second client device is selected for disassociation with the access point based on a location of the second client device.

11. The medium of claim 1, wherein the second client device is selected for disassociation with the access point based on applications currently executing on the second client device.

12. A non-transitory computer readable medium comprising instructions which, when executed by one or more hardware processors, cause the one or more hardware processors to:
    detect that a call quality for a current ongoing call corresponding to a first client device associated with an access point is below a first threshold value, wherein the call quality is determined based on a dropped packet rate for the current ongoing call;
    responsive to detecting that a call quality for the current ongoing call is below the threshold value:
        determine whether a second client device is a voice client on any ongoing voice call;
        determine whether the second client device is a non-voice client;
        select the second client device associated with the access point for disassociation with the access point; and
        cause the second client device to disassociate with the access point in response to:
            the second client device not being on any ongoing voice call; a maximum number of disassociations caused for the second client device, performed by a set of access points, has not been reached and a total number of voice clients being greater than an upper limit of voice clients; and
        refrain from causing the second client device to disassociate with the access point in response to the total number of voice clients being less than a lower limit of voice clients wherein the second client device is selected for disassociation with the access point based on applications currently executing on the second client device.

13. The medium of claim 12, wherein the call quality is determined based on one or more of a detected level of interference or a data throughput level for the current ongoing interference level.

14. The medium of claim 12, wherein the second client device is selected for disassociation with the access point responsive to determining that the second client device has a level of data traffic above the second threshold value and that the second client device is not on any current ongoing voice call.

15. The medium of claim 12, wherein the second client device is selected for disassociation with the access point based on a user role or priority associated with the second client device.

16. The medium of claim 12, wherein the second client device is selected for disassociation with the access point based on applications currently executing on the second client device.

17. A system, comprising:
   a processor; and
   a memory storing machine readable instructions to cause the processor to:
      detect that a call quality for a current ongoing call corresponding to a first client device associated with an access point is below a first threshold value, wherein the call quality is determined based on a dropped packet rate for the current ongoing call;
      responsive to detecting that a call quality for the current ongoing call is below the first threshold value:
         determine whether a second client device is a voice client on any ongoing voice call;
         determine whether the second client device is a non-voice client;
         select the second client device associated with the access point for disassociation with the access point:
            based on a signal quality value for a wireless connection between the second client device and the access point; and
            responsive to determining that a maximum number of disassociations caused for the second client device performed by a set of access points has not been reached;
         cause the second client device to disassociate with the access point in response to the second client device not being on any ongoing voice call and a total number of voice clients being greater than an upper limit of voice clients; and
         refrain from causing the second client device to disassociate with the access point in response to the total number of voice clients being less than a lower limit of voice clients wherein the second client device is selected for disassociation with the access point responsive to determining that the second client device has a level of data traffic above a second threshold value and that the second client device is not on any current ongoing voice call.

18. The system of claim 17, wherein the second client device is selected for disassociation with the access point responsive to determining that the second client device has a level of data traffic above the second threshold value and that the second client device is not on any current ongoing voice call.

19. The system of claim 17, wherein the call quality is determined based on one or more of a detected level of interference or a data throughput level for the current ongoing level.

20. The system of claim 17, wherein the second client device is selected for disassociation with the access point based on a location of the second client device.

* * * * *